United States Patent [19]

Seely et al.

[11] 4,332,453
[45] Jun. 1, 1982

[54] FILM LOADING APPARATUS

[75] Inventors: Neil G. Seely, Rochester; David C. Smart, Penfield, both of N.Y.

[73] Assignee: Eastman Kodak Company, Rochester, N.Y.

[21] Appl. No.: 260,875

[22] Filed: May 6, 1981

[51] Int. Cl.³ .................... G03B 17/02; G03B 1/00
[52] U.S. Cl. .................... 354/288; 354/212
[58] Field of Search .............. 242/71.1; 354/203, 275, 354/288, 289, 204, 205, 206, 212, 213, 214, 215

[56] References Cited

U.S. PATENT DOCUMENTS

| | | | |
|---|---|---|---|
| 2,578,283 | 12/1951 | Bornemann et al. | 354/212 |
| 2,592,158 | 4/1952 | Kirby et al. | 242/71.1 |
| 2,648,265 | 8/1953 | Candela | 354/212 X |
| 3,049,981 | 8/1962 | Elliott et al. | 354/213 |
| 3,806,243 | 4/1974 | Kosarko | 352/29 |

*Primary Examiner*—Donald A. Griffin
*Attorney, Agent, or Firm*—R. A. Eields

[57] ABSTRACT

A photographic camera is adapted to receive a film container which supports a filmstrip having a normally curled leader extending from the film container. As the film container is loaded in the camera, means on the camera deflects successive longitudinal edge portions of the curled leader into a substantially straight line, incrementally uncurling the film leader, and guides the uncurled leader, straightened edge portions first, into a film passageway in the camera.

10 Claims, 9 Drawing Figures

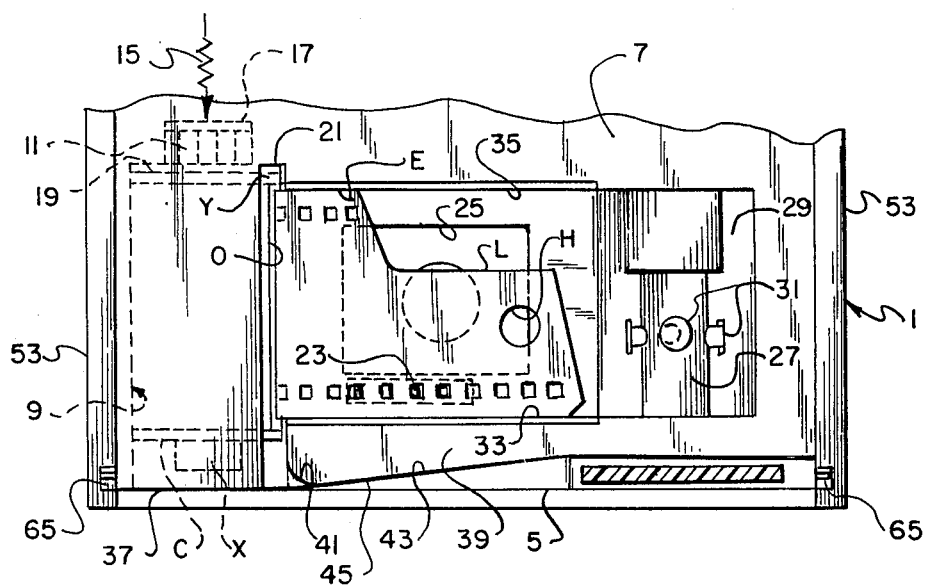

FILM LOADING APPARATUS

BACKGROUND OF THE INVENTION

1. Field of the Invention

The present invention generally relates to photographic apparatus adapted to receive a film container of the type supporting a filmstrip having a leader extending from the container. More particularly, the invention relates to loading apparatus for properly positioning the film leader in a camera or other photographic device as the film container is received in such device.

2. Description of the Prior Art

Many 35 mm cameras are adapted to receive both film cassettes, which can be reloaded by the user with coiled 35 mm film cut from long rolls, and film magazines, which are factory-loaded with coiled 35 mm film and not reusable. Typically, some difficulty exists in loading 35 mm cameras with film from either a cassette or a magazine. For example, in a bottom-loaded 35 mm camera, such as the Leica M4 series or more recent M5, the cassette or the magazine is first inserted endwise, i.e., axially, slightly into a film supply chamber, opened at the bottom of the camera by removing a baseplate. Just enough film leader to reach an automatic take-up spool in a film take-up chamber of the camera is drawn out of a light-tight opening in the film container. Then, the drawn leader, which is normally curled, is held straight and inserted edgewise, i.e., longitudinal edge first, into a straight guide slot connecting the supply and take-up chambers. At the same time, insertion of the film container into the supply chamber is completed and the forward end of the drawn leader is positioned in the take-up chamber for engagement with the take-up spool.

Other 35 mm cameras, such as the Olympus OM-10, are loaded at the back rather than at the bottom. First, a cassette or a magazine is inserted into the supply chamber of the camera, and the necessary length of film leader is drawn out of the opening in the film container and uncurled. Then, a forward end of the drawn leader is inserted into a groove in a take-up spool in the take-up chamber of the camera, coupling the forward end with the take-up spool.

Such film loading procedure for cameras using film cassettes or film magazines are troublesome and require a certain amount of manual dexterity. A film container that simplifies the loading procedure is disclosed in U.S. Pat. No. 2,592,158, issued Apr. 8, 1952 to Kirby et al. In that patent, a film cassette is provided with a telescoping U-shaped wire frame, which is nested in a groove to support the normally curled film leader in a straight line. In operation, the wire frame is pulled out with the film leader. Then, as the film cassette is inserted in the supply chamber of a camera, the straightened leader is guided by the wire frame into a film slot, connected with the supply chamber. At the same time, the wire frame contacts an inner wall of the supply chamber and is pushed back into the groove. While this cassette eliminates the step in the film loading procedure of manually holding the curled leader straight for insertion into a film slot, certain problems may arise. For example, the pulled-out wire frame can jam in the nesting groove, preventing completed insertion of the cassette into the supply chamber of the camera. Moreover, use of this cassette is limited to cameras specifically designed to accept the cassette.

SUMMARY OF THE INVENTION

The above-described film loading problems associated with known cameras and film containers are believed solved by the present invention. Specifically, the present invention provides improved means for quickly and easily loading film in a camera or other photographic device. This is accomplished, for the most part, by providing loading means for uncurling the film leader extending from a film container and for guiding the uncurled leader into the photographic device as the film container is received in such device.

In keeping with the teachings of the present invention, there is provided in photographic apparatus adapted to receive a film container of the type supporting a filmstrip having a normally curled leader extending from the container, the improvement comprising:

means defining a film passageway adapted to receive a substantially uncurled film leader edgewise, i.e., longitudinal edge first, as a film container is moved into the photographic apparatus; and means, effective upon movement of the film container into the photographic apparatus, for substantially uncurling the film leader and for guiding the uncurled leader longitudinal edge first toward the film passageway.

According to a preferred embodiment of the present invention, opening the photographic apparatus uncovers a means of access to the film passageway, along which the film leader is moved longitudinal edge first into the passageway. A substantially straight member, located adjacent the access means, is disposed to extend across successive longitudinal edge portions of the film leader, increasingly distant from the film container, as the container is moved into the photographic apparatus. Upon moving the film container into the opened photographic apparatus, the straight member deflects successive longitudinal edge portions of the curled leader into a substantially straight line, incrementally uncurling the film leader, and guides the uncurled leader, respective straightened edge portions, first onto the access means to the film passageway. When the film container is completely in the photographic apparatus, the uncurled leader comes to rest in the film passageway, properly positioned for advance to a film take-up chamber in such apparatus. The take-up chamber includes a rotatably mounted take-up spool for engaging a forward end of the uncurled leader.

BRIEF DESCRIPTION OF THE DRAWINGS

FIG. 7 is a back elevation view of the opened camera, depicting the final state of film loading;

FIG. 8 is a partial side elevation view of the camera, showing a cover door opened to a partially opened position for film loading.

DESCRIPTION OF THE PREFERRED EMBODIMENT

The present invention is described as being embodied in a relatively simple 35 mm camera. Because such cameras are well known, this description is directed in particular to elements forming part of or cooperating directly with the preferred embodiment. It is to be understood, however, that other elements not shown or described may take various forms known or obvious to one having ordinary skill in the design of cameras.

Figure 1:
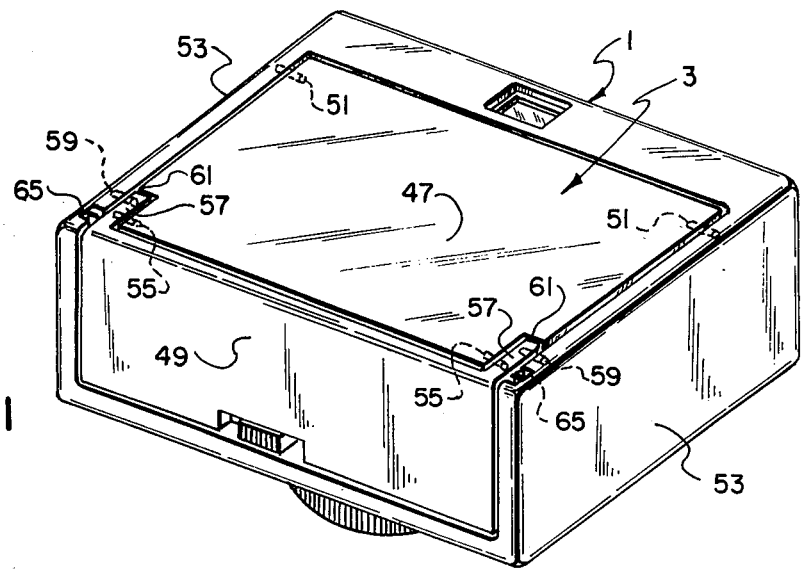
FIG. 1 is a rear perspective view of a photographic camera.
Figure 2:
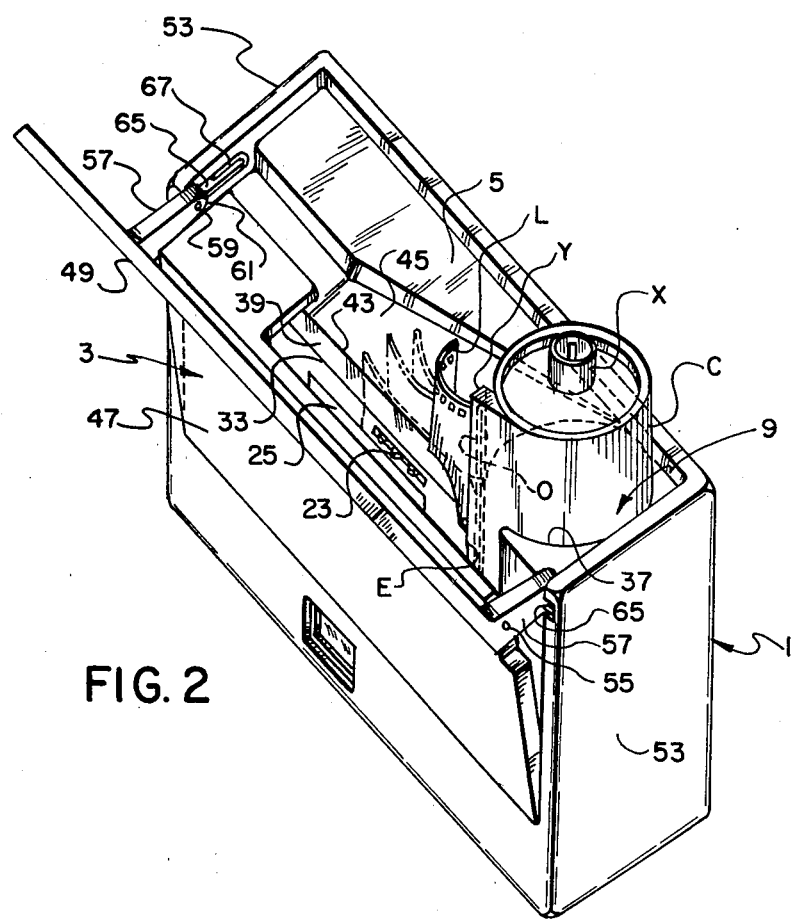
FIG. 2 is a bottom perspective view of the camera, opened to show loading apparatus in accordance with a preferred embodiment of the invention for uncurling a film leader extending from a film container and for guiding the uncurled leader into the camera as the film container is received in the camera.

Referring now to the drawings, and in particular to FIGS. 1 and 2, there is shown a bottom-loaded 35 mm camera for receiving a film container C, such as a conventional 35 mm film magazine or film cassette. The film container C, as is known, includes a rotatably mounted core member X, which supports a coiled 35 mm filmstrip within the film container. The filmstrip has a normally curled leader L extending out of a light-tight opening O in a lipped portion Y of the film container C. The camera preferably comprises a body portion 1 and a compound or multi-element articulated cover door 3. Details of the cover door 3 are described below, after a description of certain apparatus for film loading. However, in connection with film loading, it should be observed, as shown in FIG. 2, that the cover door 3 can be partially opened to uncover a bottom portion 5 of the camera body 1.

Figure 3:
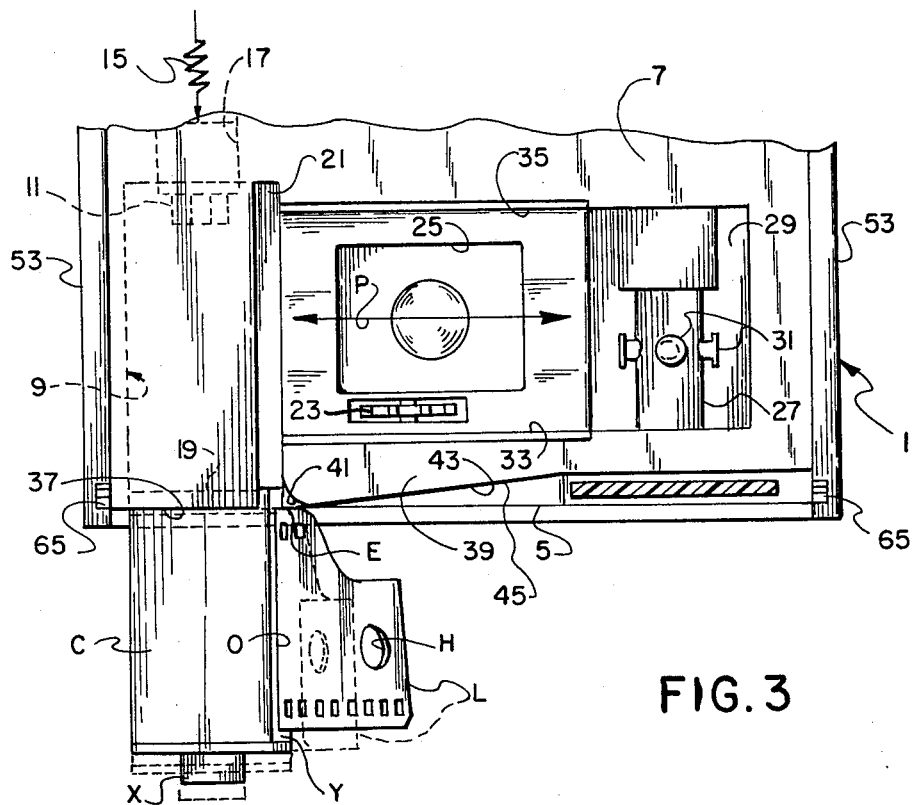
FIG. 3 is a back elevation view of the opened camera, depicting an initial state of film loading.

The camera body 1, as shown in FIG. 3 with the cover door omitted for the sake of clarity, is partially open at a back portion 7 to provide access to the camera interior for a number of conventional purposes, such as clearing a film jam, and cleaning or repairing an interior mechanism. A loading or supply chamber 9 in the camera body 1 is shaped to receive and hold the film container C. Known means, such as a spindle 11, urged by a spring 15 into the loading chamber 9 from a cavity 17, rotatably supports the core member X of the film container C during film advance and film rewind in the camera. The spindle 11 is split to engage a cross-rib, not shown, of the core member X, within a well at one end 19 of the film container C. A slot-like extension 21 of the loading chamber 9 is shaped to hold the lipped portion Y of the film container C to prevent rotation of the film container as the filmstrip is advanced from the container or wound back into the container. Film advance and film rewind may be accomplished using commonplace drive mechanisms and, in this connection, there is illustrated in FIG. 3, a sprocket wheel 23 for engaging and advancing the filmstrip. As is customary, film advance is from the slot-like extension 21 of the loading chamber 9, across an exposure frame 25, and onto a take-up spool 27, rotatably mounted within a take-up chamber 29 in the camera body 1. The take-up spool 27 includes a circular array of radially extending lugs 31 for automatically engaging a hole H in the film leader L. Two parallel beveled guide surfaces 33 and 35 or other suitable means, such as guide rails or guide rollers, not shown, define a film passageway or a film path, indicated by a double-headed arrow P in FIG. 3, for guiding film between the slot-like extension 21 and the take-up chamber 29.

Figure 4:
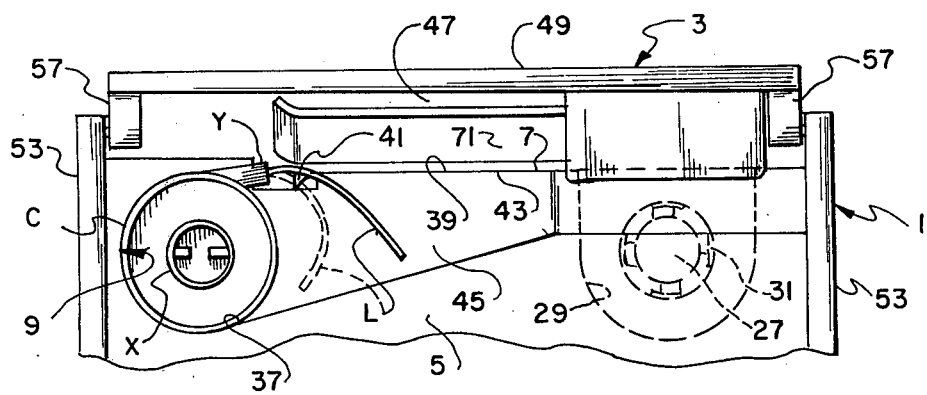
FIG. 4 is a bottom plan view of the opened camera, depicting the same state of film loading as in FIG. 3.

In FIGS. 3 and 4, it can be seen that the loading chamber 9 is only accessible for container-loading at the bottom portion 5 of the camera body 1, through an entrance opening 37 to the loading chamber. The entrance opening 37 is uncovered by partially opening the cover door 3, as shown in FIGS. 2 and 4. This permits the film container C to be inserted axially, i.e., by the end 19 first in FIG. 3, through the entrance opening 37 into the loading chamber 9. The film passageway P is accessible for leader-loading at the bottom portion 5 of the camera body 1, along a flat surface 39 extending parallel to the film passageway. As the film container C is inserted axially into the loading chamber 9, the flat surface 39 supports the film leader L, which moves edgewise, i.e., longitudinal edge first, into the film passageway P.

Figure 5:
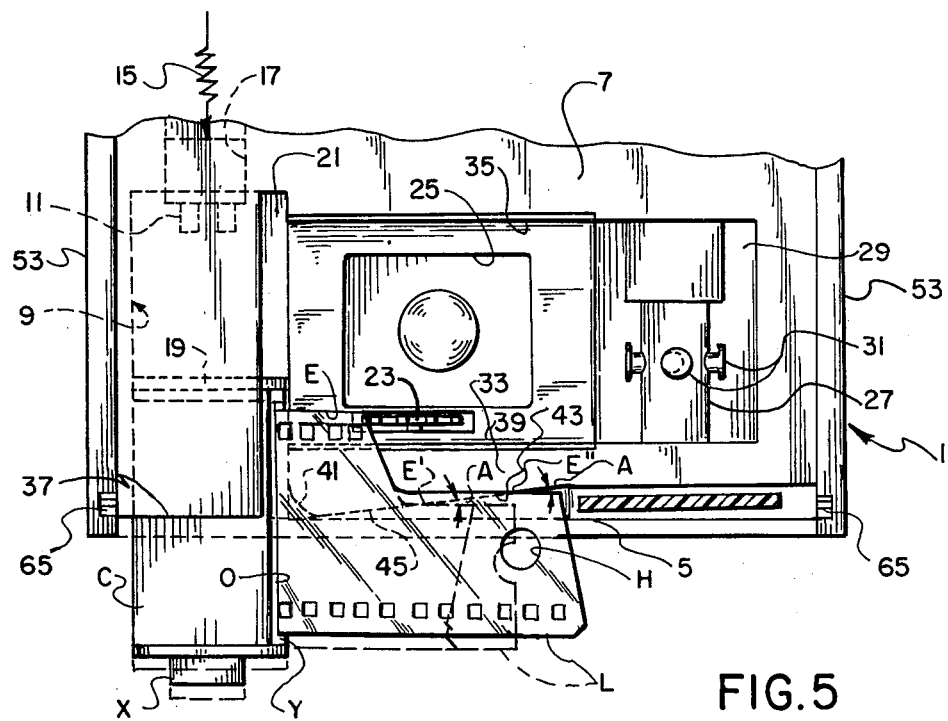
FIGS. 5 and 6 are back elevation and plan views, respectively, depicting an intermediate state of film loading.
Figure 6:
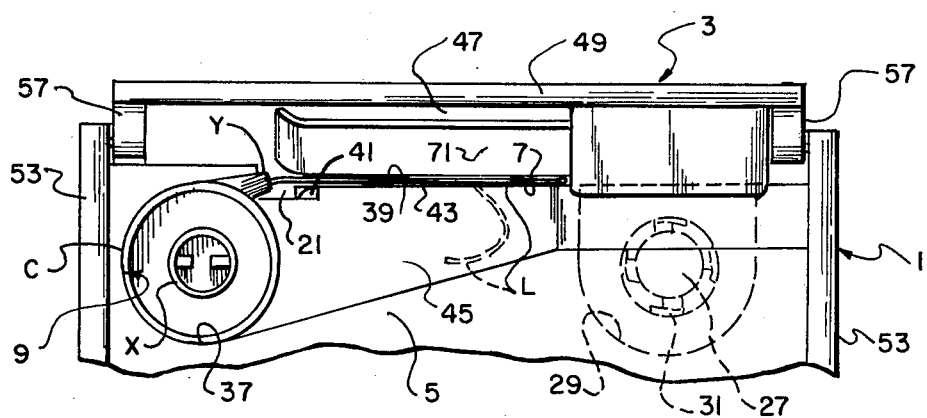

In prior art cameras, the film leader L, which is normally curled, was manually held straight and inserted edgewise into a guide slot as the film container C was loaded in the camera. This required some degree of manual dexterity, and could be difficult. According to the invention, there is provided means for uncurling the film leader L as the film container C is inserted into the loading chamber 9. When the end 19 of the film container C is moved through the entrance opening 37 into the loading chamber 9, as shown in FIG. 3, a longitudinal edge portion E of the film leader L, proximate the container opening O, is pushed against a quarter-round corner 41, adjacent the slot-like extension 21 of the loading chamber. The corner 41, as shown in FIG. 4, directs the longitudinal edge portion E crosswise onto an inclined straight edge 43, formed by the juncture of the flat surface 39 and an inclined relieved plane 45. The straight edge 43 operates in two ways, as shown in FIGS. 5 and 6. First, the straight edge 43 deflects successive longitudinal edge portions, for example E' and E'' in FIG. 5, of the film leader L into a substantially straight line, to incrementally uncurl the film leader, as those edge portions are pushed crosswise against the straight edge by insertion of the film container C into the loading chamber 9. And second, the straight edge 43 deflects the respective straightened edge portions of the film leader L onto the flat surface 39. The flat surface 39, in turn, acts as a support which prevents the film leader from re-curling and guides the uncurled leader, straightened edge portions first, into the film passageway P.

Preferably, as shown in FIG. 5, the straight edge 43 is inclined from the entrance opening 37 to the loading chamber 9, to make an oblique angle A with successive longitudinal edge portions, for example, E' and E'', of the film leader L as the film container C is inserted into the loading chamber. Orientation of the straight edge in this manner with respect to successive longitudinal edge portions of the film leader, facilitates uncurling and minimizes any chance of a snag. The plane 45, over which the film leader L moves to uncurl, as shown in FIG. 6, is inclined in conformity with the straight edge 43 and is relieved from the remainder of the bottom portion 5 of the camera body 1 in order to provide sufficient room for the film leader to uncurl without affecting the straightening action occurring along the straight edge.

When the film container C is completely inserted in the loading chamber 9, as shown in FIG. 7, the uncurled leader L comes to rest in the film passageway P between the beveled guide surfaces 33 and 35 and is positioned for engagement with the sprocket wheel 23.

Means, not shown, are provided on the inside of the cover door 3 for holding the uncurled leader L against the sprocket wheel 23 upon closing the cover door. Rotation of the sprocket wheel 23 and the take-up spool 27, for advancing the first exposure area of the filmstrip into alignment with the exposure frame 25, may be initiated automatically by closing the cover door 3 or manually by depressing a button, not shown, on the camera body 1.

The cover door 3, as shown in FIGS. 1 and 8, comprises a back door 47 and a bottom door 49. The back door 47 is supported for pivotal opening and closing movement on a first axis, aligned with a first pair of pivot pins 51 connecting the back door with opposite sides 53 of the camera body 1. The bottom door 49 is supported for pivotal opening and closing movement on a second axis, aligned with a second pair of pivot pins 55 connecting respective arm-like extensions 57 of the bottom door with the back door 47 at intermediate locations on the arm-like extensions. The second axis, defined by the two pins 55, extends parallel to the first axis, defined by the two pins 51. A pair of follower pins 59 project from respective end portions 61 of the two arm-like extensions 57 into a pair of cam or motion-imparting slots 63, formed in the opposite sides 53 of the camera body 1. The follower pins 59 are constrained by the cam slots 63 to translational and pivotal movements within the cam slots. With such an arrangement, the cover door 3 may be opened from a closed position to a partially opened position (for film loading) simply by pivoting the bottom door 49 open on the pivot pins 55, as shown in FIG. 8. Opening the bottom door 49, pivots the arm-like extensions 57 of the bottom door about their intermediate locations adjacent the pivot pins 55. At the same time, the follower pins 59 on the arm-like extensions 57 translate and pivot in the cam slots 63. This causes the arm-like extensions 57 to act as follower arms, urging the back door 47 by way of the pivot pins 55 to pivot open on the pivot pins 51. Accordingly, opening the bottom door 49 to the partially opened position, shown in FIG. 8, causes a like opening of the back door 47. And conversely, as can be appreciated from FIG. 8, closing the bottom door 49 from the partially opened position, will cause a like closing of the back door 47.

Figure 9:
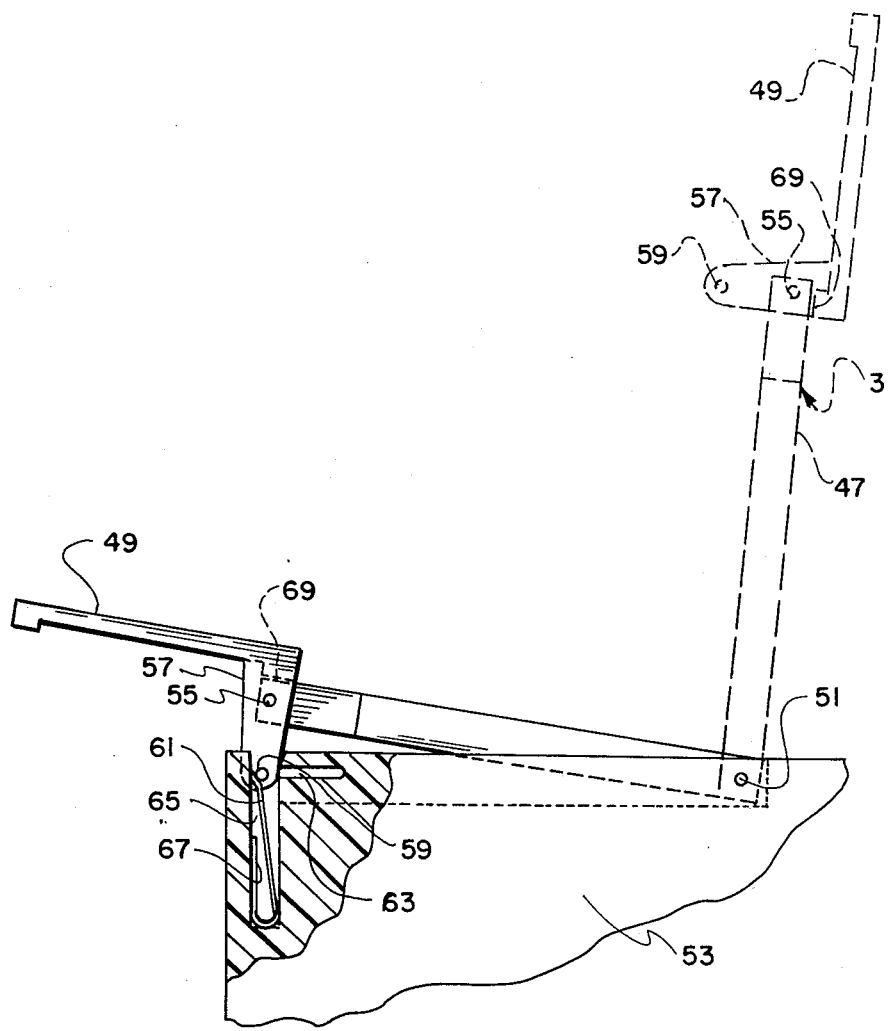
FIG. 9 is a partial side elevation view of the camera, showing the cover door opened to a fully opened position.

The two cam slots 63 open into respective pin-exit slots 65, formed in the opposite sides 53 of the camera body 1. When the cover door 3 is in the partially opened position, as shown in FIG. 8, a pair of flexible pin-retaining members 67 in the respective pin-exit slots 65 ordinarily prevent the two follower pins 59 from moving out of the respective cam slots 63 into the pin-exit slots. The follower pins 59 are blocked by the pin-retaining members 67 at individual locations overcenter of the pivot pins 55, which maintains the cover door 3 in the partially opened position. To open the cover door 3 from the partially opened position to a fully opened position, as shown in FIG. 9, the bottom door 49 is pivoted open on the pivot pins 55 until the follower pins 59 flex the pin-retaining members 67 aside and move into the pin-exit slots 65. At this time, an interior edge 69 of the bottom door 49 bears against the back door 47, which prevents the bottom door from pivoting open farther on the pivot pins 55. However, the bottom door 49 can then be pivoted open in unison with the back door 47 on the pivot pins 51. Pivoting the bottom door 49 open with the back door 47 on the pivot pins 51, removes the follower pins 59 from the pin-exit slots 65, permitting both doors 3 to be opened to the fully opened position.

When the cover door 3 is in the partially opened position, as shown in FIGS. 2 and 8, the back door 47 shields the camera interior by substantially covering the back portion 7 of the camera body 1, and the bottom door 49 uncovers the bottom portion 5 of the camera body to allow limited access to the camera interior for film loading. Conversely, the cover door 3 in the fully opened position, as shown in FIG. 9, allows much greater access to the camera interior by uncovering the back portion 7 of the camera body. Accordingly, on the one hand, the cover door 3 in the partially opened position substantially shields the camera interior during film loading from foreign particles, fingerprints, and tampering with an interior mechanism. And on the other hand, the cover door in the fully opened position allows access to the camera interior should it become necessary, for example, to clear a film jam in the camera or to repair or clean an interior mechanism.

A spring-urged pressure plate 71, shown in FIG. 4, is mounted on the inside of the back door 47. When the cover door 3 is in the closed position, the pressure plate 71 is located adjacent the film passageway P to hold a section of filmstrip from the film container C against the exposure frame 25 during picture-taking. However, the pressure plate 71 is moved with the cover door 3 to the partially opened position, in FIG. 4, away from the film passageway P, to provide space for moving the film leader L into the film passageway as the film container C is inserted into the loading chamber 9. Means, not shown, is located on the inside of the bottom dor 49 for lightly depressing the film container C and the core member X, to assure their proper positioning in the loading chamber 9, as the cover door 3 is closed from the partially opened position.

The invention has been described in detail with particular reference to a preferred embodiment thereof, but it will be understood that variations and modifications can be effected within the spirit and scope of the invention.

I claim:

1. In photographic apparatus adapted to receive a film container supporting a filmstrip having a normally curled leader extending from the container, the improvement comprising:

means defining a film passageway adapted to receive a substantially uncurled film leader longitudinal edge first as a film container is moved into said photographic apparatus; and means, effective upon movement of the film container into said photographic apparatus, for substantially uncurling the film leader and for guiding the uncurled leader longitudinal edge first toward said passageway.

2. The improvement as recited in claim 1, wherein said uncurling means includes means located to extend across a longitudinal edge of the film leader as the film container is moved into said photographic apparatus, for deflecting the longitudinal edge to uncurl the leader.

3. In photographic apparatus adapted to receive a film container supporting a filmstrip having a normally curled leader extending from the container, the improvement comprising:

means defining a film passageway adapted to receive a substantially uncurled film leader longitudinal edge first as a film container is moved into said photographic apparatus; and means, effective upon moving the film container into said photographic apparatus, for substantially uncurling successive longitudinal edge portions of the film leader to incrementally uncurl the leader and for guiding the leader, uncurled edge portions first, toward said passageway.

4. The improvement as recited in claim 3, wherein said uncurling means is adapted to uncurl successive longitudinal edge portions of the film leader increasingly distant from the film container.

5. In photographic apparatus adapted to receive a film container supporting a filmstrip having a normally curled leader extending from the container, the improvement comprising:

means defining a film passageway adapted to receive a substantially uncurled film leader longitudinal edge first as a film container is moved into said photographic apparatus; and means, effective upon moving the film container into said photographic apparatus, for substantially straightening successive longitudinal edge portions of the film leader to incrementally uncurl the leader and for guiding the leader, straightened edge portions first, into said passageway.

6. The improvement as recited in claim 5, wherein said straightening means includes a substantially straight member for deflecting into a substantially straight line successive longitudinal edge portions of the film leader increasingly distant from the film container as the container is moved into said photographic apparatus.

7. The improvement as recited in claim 6, wherein said straight member is inclined at an oblique angle with the successive edge portions of the film leader and extends across the successive edge portions as the film container is moved into said photographic apparatus.

8. In photographic apparatus adapted to receive a film container supporting a filmstrip having with a normally curled leader extending from the container, the improvement comprising:

means defining a film passageway adapted to receive a substantially uncurled film leader longitudinal edge first as a film container is moved into said photographic apparatus;

elongate means, inclined at an oblique angle with successive longitudinal edge portions of the film leader increasingly distant from the film container as the container is moved into said photographic apparatus, and effective upon said movement of the container, for deflecting the successive edge portions into a substantially straight line to incrementally uncurl the leader; and means for guiding the uncurled leader, straightened edge portions first, into said passageway.

9. The improvement as recited in claim 8, wherein said guiding means includes a substantially flat surface defining an access to said film passageway for receiving the uncurled leader, straightened edge portions first, and said elongate means includes a substantially straight edge-defining member adjacent said flat surface for deflecting the respective edge portions onto said flat surface.

10. The improvement as recited in claim 9, wherein said flat surface is adapted to support the uncurled leader to prevent the leader from re-curling.

* * * * *

UNITED STATES PATENT OFFICE
CERTIFICATE OF CORRECTION

PATENT NO. : 4,332,453
DATED : June 1, 1982
INVENTOR(S) : Neil G. Seely and David C. Smart It is certified that error appears in the above-identified patent and that said Letters Patent are hereby corrected as shown below:

Title Page, "R. A. Eields" should read --R. A. Fields--

Column 6, Line 42, "I Claim" should read --We Claim--

Signed and Sealed this

Seventeenth Day of August 1982

[SEAL]

Attest:

GERALD J. MOSSINGHOFF

Attesting Officer     Commissioner of Patents and Trademarks